No. 787,387. PATENTED APR. 18, 1905.
F. W. MEEKER.
BRIQUET MACHINE.
APPLICATION FILED SEPT. 19, 1904.

WITNESSES:

INVENTOR
Frederick Wood Meeker
BY
ATTORNEY

No. 787,387. PATENTED APR. 18, 1905.
F. W. MEEKER.
BRIQUET MACHINE.
APPLICATION FILED SEPT. 19, 1904.

WITNESSES:
Geo W Eisenbraun
Fred'k F. Schuetz

INVENTOR
Frederick Wood Meeker
BY A. Faber du Faur
ATTORNEY No. 787,387. PATENTED APR. 18, 1905.
F. W. MEEKER.
BRIQUET MACHINE.
APPLICATION FILED SEPT. 19, 1904.

WITNESSES:
Chas. D. Thomas.
Geo. W. Eisenbraun

INVENTOR
Frederick Wood Meeker
BY
A. Faber du Faur
ATTORNEY

No. 787,387.

Patented April 18, 1905.

UNITED STATES PATENT OFFICE.

FREDERICK WOOD MEEKER, OF RYE, NEW YORK.

BRIQUET-MACHINE.

SPECIFICATION forming part of Letters Patent No. 787,387, dated April 18, 1905.

Application filed September 19, 1904. Serial No. 225,105.

*To all whom it may concern:*

Be it known that I, FREDERICK WOOD MEEKER, a citizen of the United States of America, residing at Rye, in the county of Westchester and State of New York, have invented certain new and useful Improvements in Briquet-Machines, of which the following is a specification.

My invention relates to improvements in machines for making briquets, and in particular to machinery for carrying a series of multiple molds upon a revolving table, successively filling them, compacting and compressing the material, and finally discharging the finished briquets.

The nature of my invention will best be understood when described in connection with the accompanying drawings, in which—

Similar letters and numerals of reference designate corresponding parts throughout the several views.

In my improved apparatus briquets are made from the prepared material by four essential successive operations—filling of the multiple molds with the material to be made into briquets, preliminary compression of the material, final compression of the material, and removal of the finished briquets from the mold. For sticky materials the operations of dusting the top of the filled molds and the dies of the final press are added.

Figure 1:
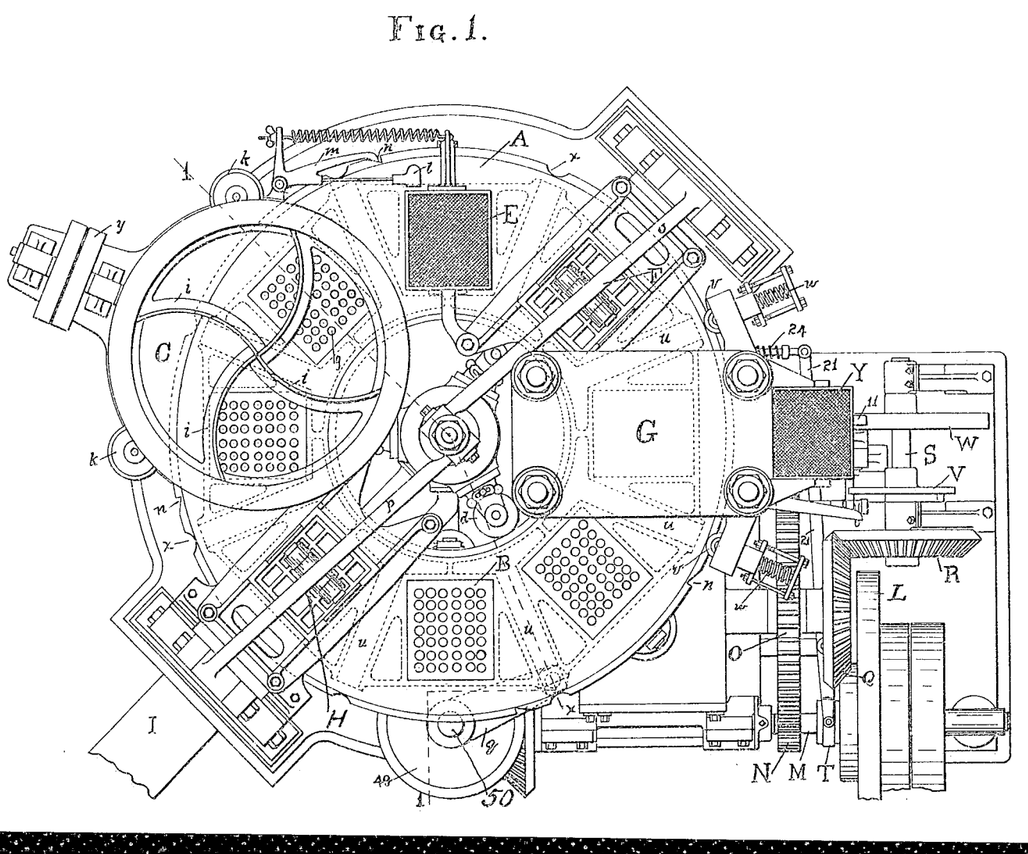
Figure 1 represents a top view of the machine.
Figure 2:
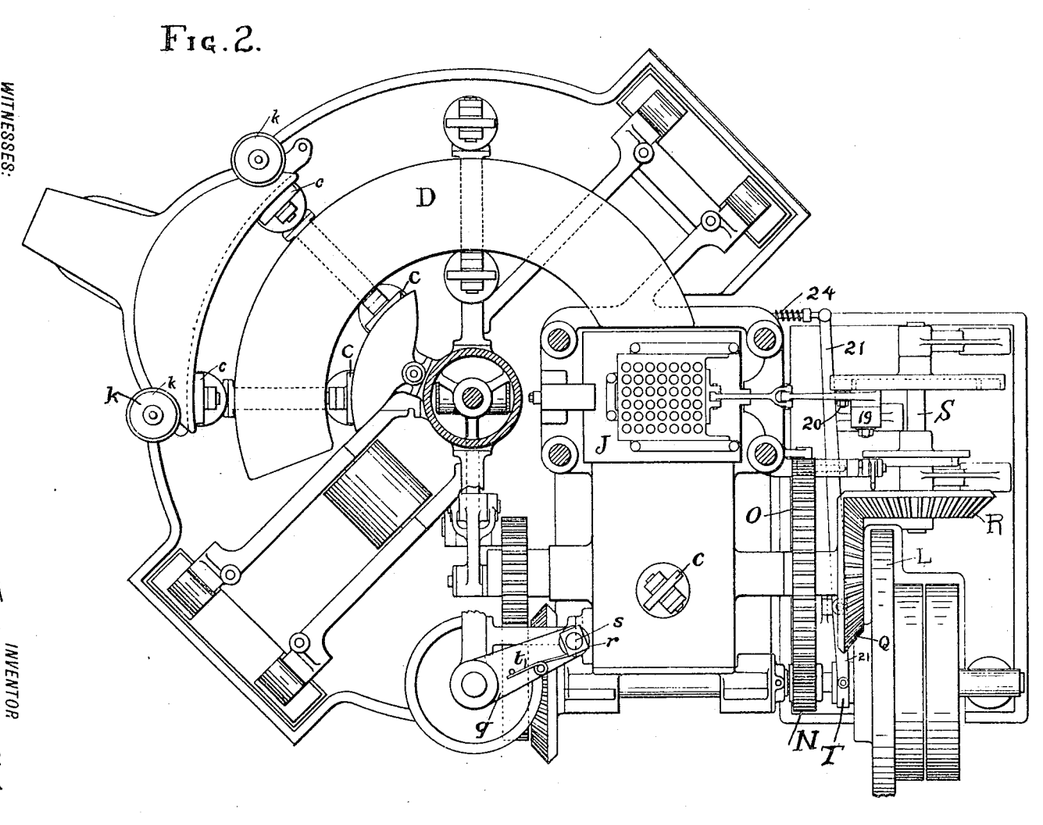
Fig. 2 is a top view with the table removed.
Figure 4:
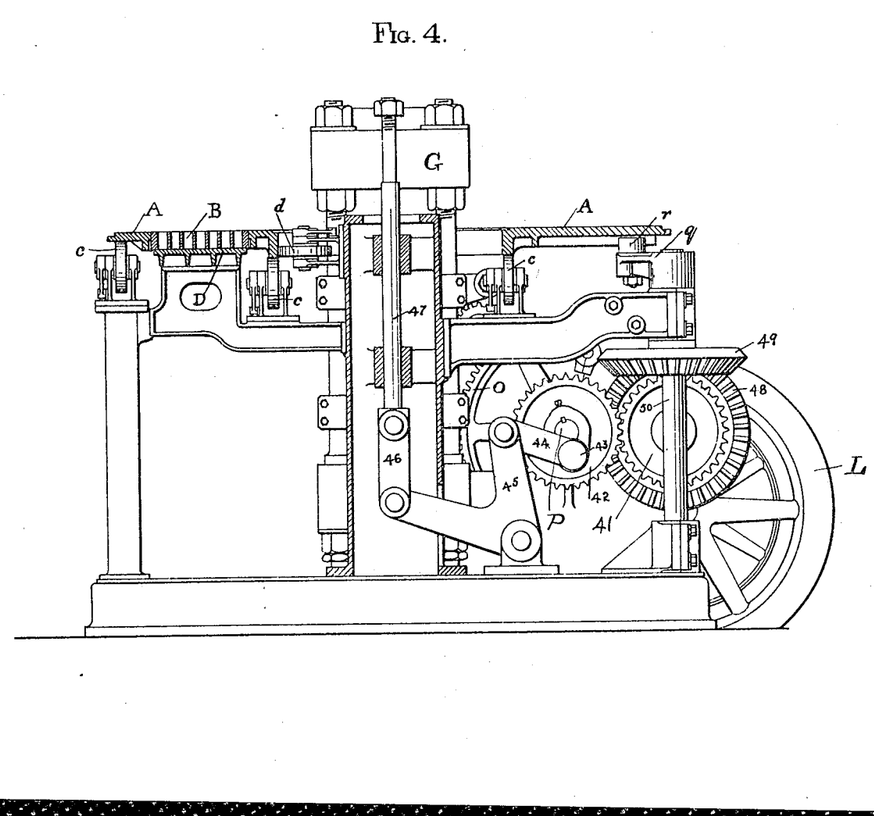
Fig. 4 is a vertical section on the radii 1 1, Fig. 1, and an elevation of part of the mechanism.

As shown in Figs. 1 and 4, an annular revoluble table A is mounted upon the frame of the machine and holds the molds B and successively presents the same through step-by-step motion to the devices for filling, dusting, initial compression, final compression, and discharge. Step-by-step rotary motion is imparted to the table by the horizontal crank-arm $q$, which is fixed to the vertical shaft 50, Fig. 4, and revolves with it. Upon the outer end of the crank-arm $q$, Figs. 4 and 2, is carried a rectangular block $r$, Figs. 2, 4, 11, and 12, which is mounted on the pin $s$, Fig. 11, and is held in proper position by means of a spring $t$, Figs. 11 and 12. The block passes into and slides within the guide-grooves $u$, Fig. 1, on the under side of the table and causes angular motion of the table during part of the revolution of the crank-arm $q$, the block $r$ being held squarely against the side of the groove by the spring $t$. The slot and crank are so proportioned as to cause the table to revolve through an angle equal to the angular distance of the molds by part of a revolution of the crank-arm. While the block $r$ is clear of the groove $u$ the table is at rest, and during this period of rest the apparatus for initial and final compression and for discharging the finished briquet from the mold come into action. Thus by each complete revolution of the crank $q$ a full set of briquets is discharged. During the period of rest the table A is held firmly in place by rollers $v$, acted upon by springs $w$ and engaging the two notches $x$ of the table. The notches are arranged in the table as indicated in Fig. 1.

Figures 8, 9, 10, 11, 12:
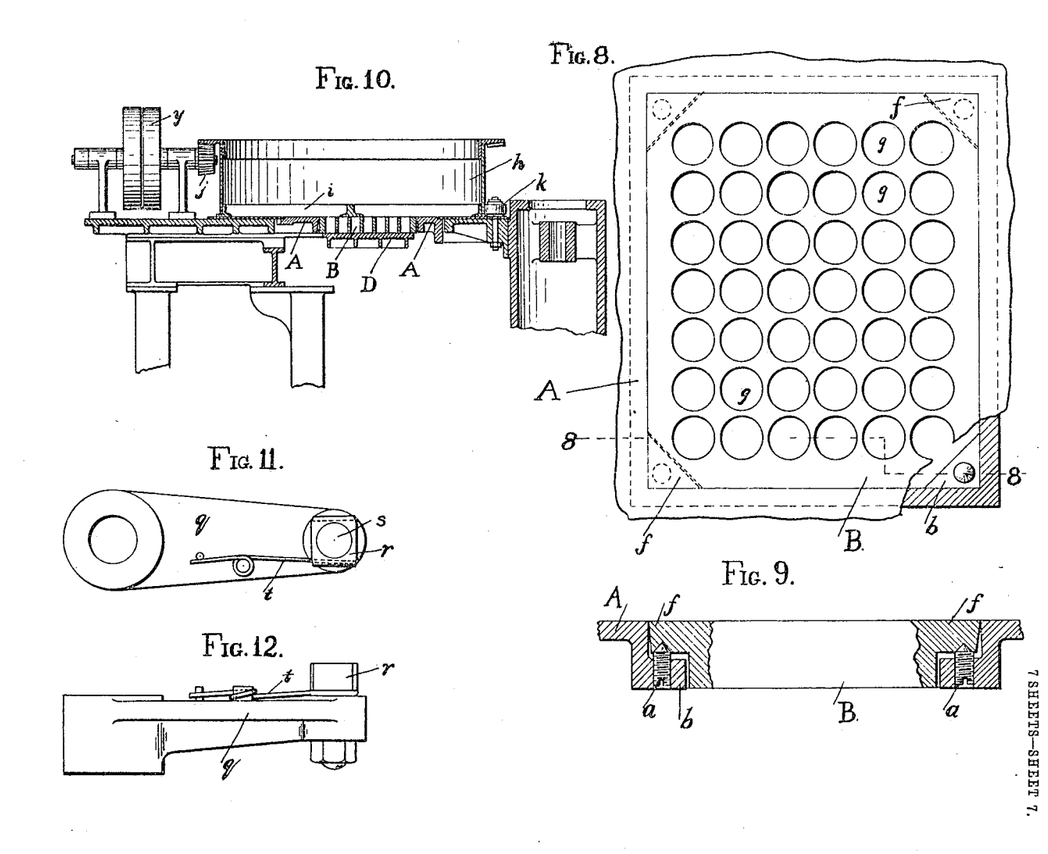
Fig. 8 is a top view of the mold-plate.
Fig. 9 is a section of the mold-plate and support on the line 8 8, Fig. 8.
Fig. 10 is a vertical section of the filling device.
Figs. 11 and 12 are detail views of the arm for imparting step-by-step rotary motion to the table.

The filling device C (shown in plan in Fig. 1 and in detail vertical section, Fig. 10) consists of a hollow cylinder $h$, Fig. 10, extending partly over the table A, and to which cylinder the material is delivered either by hand or by machinery, such as a bucket elevator. The cylinder is retained in position by three horizontal rollers $k$, Figs. 1 and 10. The cylinder is caused to revolve by a bevel-pinion $j$, Fig. 10, engaging the under side of a bevel-wheel inserted into or otherwise secured to the cylinder $h$. Power is supplied to the pinion through the pulley $y$, Figs. 1 and 10. The cylinder is without a bottom, but contains four curved arms $i$, Fig. 1, which revolve with it and serve to move the material across the molds in such a manner as to thoroughly fill them. In order to retain the loose material in the molds, an annular segmental plate D, Figs. 2 and 10, extends beneath the table A from the filling device up to the second press G.

A series of multiple molds B is loosely supported upon and carried within the table A, Figs. 1 and 9, to which step-by-step rotary motion is imparted. The molds are preferably made from a block of cast-steel perforated to the desired cross-section, which in the drawings is shown as a circle $g$, Figs. 1 and 8, and placed in the table at equal angular and equal radial distances, as shown in Fig. 1. The perforations are slightly flared at the top and bottom to allow the dies of the presses to readily enter. At the four corners of the molds B triangular prisms are cut off on the lower part, leaving projecting lips $f$, Fig. 9, which rest upon adjustable bearings, such as the set-screws $a$, Fig. 9, passing through corner-lugs $b$ of the table. The projecting lips are centered to receive the conical ends of the set-screws, so that the molds will resume their proper positions after the operation of the press. The table A, containing the molds B, is supported upon vertical rollers $c$, Fig. 4, mounted in eccentric bearings, so as to allow vertical adjustment of the table, and is also adjusted radially by similar horizontal rollers $d$, Fig. 4. The rollers are secured to the fixed framing of the machine, as shown in Fig. 4. Each mold after being filled passes under a dusting-box E, where the upper surface of the material in the molds is dusted. The dusting-box E is caused to operate by the hammer $l$ hitting the box when the mold is in the proper position, the said hammer being actuated by means such as the spring-arm of the pawl $m$ engaging a notch $n$ in the table A every time a mold comes into position beneath the dusting-box. After the material in the mold has been dusted it is passed to the initial-compression press F, Fig. 1. In this position during the temporary pause in the motion of the table dies corresponding to the perforations in the mold descend and compact the material against the plate D, Fig. 2. The arrangement for compressing the material in this press is very different from the arrangement in the next and final press. In the former case the compression being only very slight, the annular segmental plate D, Fig. 2, is easily able to withstand the force of compression. In the latter case, however, owing to the heavy pressure required by the briquets, different arrangements are made. After leaving the initial-compression press the mold passes to the final-compression press G. A dusting-box Y and a locking device are provided at this place. Before the lower platen J of the final press G ascends to effect the final compression of the previously-compacted material, dusted upon its upper surface by the duster E, the die-plate is drawn out by a carrier K under the dusting-box Y and the dies Z dusted. The dusting is accomplished by a hammer 11 striking the dusting-box Y while the die-plate J is under the said dusting-box. The hammer is operated by the projection 16 on the wheel W through the rod 12 and lever 13, which is held by the spring 14 and whose fulcrum is at 15. After being dusted the dies Z are returned by the cam-groove X to their former position, and the table A now being in the proper position the platen, with its dies dusted, ascends and effects the final compression of the material.

The carrier K is connected by the rod 17 to the lever 18, whose fulcrum is at 19. To this lever is attached a pin 20, carrying a roller which engages the cam-groove X of the wheel W on the shaft S. During one-half of a revolution of the cam X the platen is in position for compression and ascends when the table A is in proper position. During the remaining one-half of the revolution of the cam X the die-carrier is being moved out under the dusting-box Y and again returned to its original position. Motion is communicated to the cam X through the shaft S, which in turn derives its motion from the driving-shaft M through the gear-wheels N and O, the shaft P, and the miter-gear Q and R.

Figure 5:
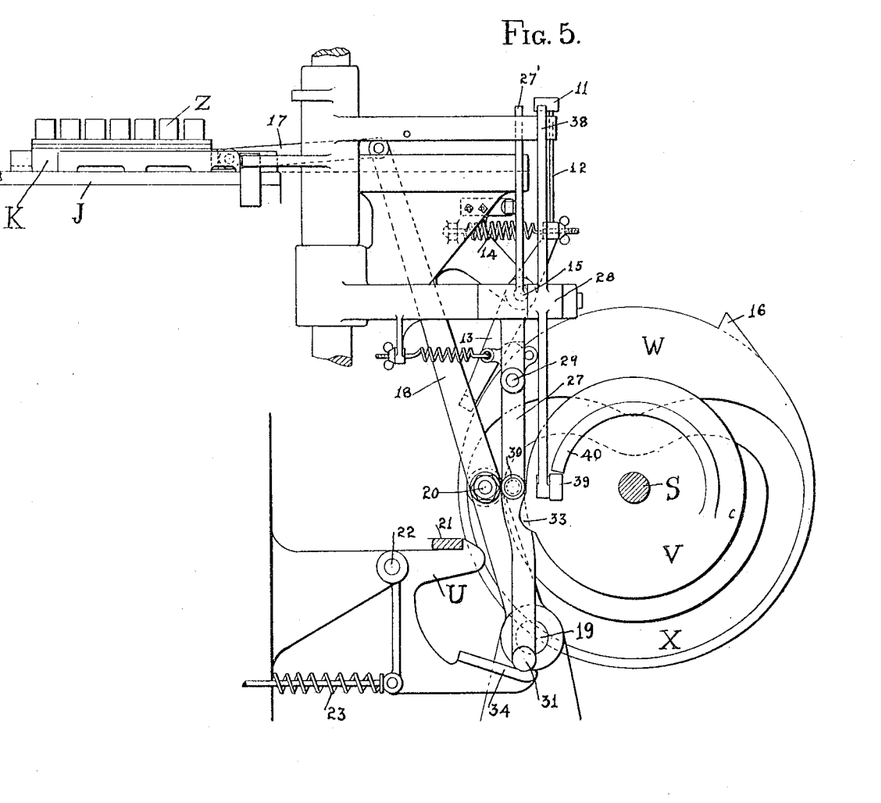
Fig. 5 is an elevation of the locking and dusting mechanism.

In order to prevent the press from acting should the die-carrier not return to its proper position or the table A, carrying the mold-plates B, fail to arrive at the proper time, and consequently fail to be in the proper position during the action of the press, a locking device is provided, which when it fails to lock shuts off the power from the entire machine, and thus throws the press out of action. This locking device is partly shown in Figs. 1 and 2 and more in detail in Figs. 5 and 6.

The motion of the main shaft M is controlled by the clutch T, so that in case the die-plate and table are not in proper position the clutch is thrown out and the shaft runs free. A lever 21, controlling the clutch T, is held in position by the catch-lever U, whose fulcrum is at 22, the said clutch being held against the lever by the spring 23. A spring 24, operating at the other extremity of the lever 21, tends to release the clutch T, but is unable to do so until the catch-lever U is tripped. The tripping of this catch occurs whenever the hook 25 fails to engage the recess 26 in the die-carrier K at the time when the table should be in position and the platen ready to ascend. The lever 27 swings about the shaft 28 and also about the fulcrum 29 and has an upper arm 27' and a lower arm carrying a roller 30 and at its lower extremity a pin 31. When the die-carrier K is locked—that is, when the hook 25 of the lever 32 is in the recess 26—the pin 31 on the lower extremity of the lever 27 is not in the same vertical plane as the catch U nor the roller 30 in the same vertical plane as the projection 33 of the wheel V, but is some distance behind. As the hook 25 of the lever 32 swings out of the recess 26 the arm 32' of the lever 32 presses against the upper arm 27' of the lever 27 and throws it back, causing the roller 30 and the pin 31 on the lower arm of the lever to come into the proper vertical plane to engage the projection 33 and to bring the pin 31 in contact with the surface 34 of the catch-lever U. It is during this time that the lower die-carrier K is withdrawn, the dies dusted, and the carrier returned to position. Although the hook 25 of the lever 32 does not engage the recess 26 during this time the catch U will not be tripped, as the projection 33 on the wheel V is not in position to engage the roller 30 on the lever 27. Should the carrier, however, not resume its proper position, the hook will fail to return to the recess 26 and the projection 33 will have revolved into position to engage the roller 30 on the lever 27. When this occurs, the lower arm of the lever 27 swings about the fulcrum 29, and its pin 31 at the lower extremity bears against the surface 34 of the catch-lever U, causing the lever to turn about the fulcrum 22, and thereby release the lever 21, controlling the clutch T, thus throwing out the clutch and shutting off the power. Should the die-carrier K return to its proper position, but the table A, carrying the mold-plates B, fail to arrive at the proper time, the rollers $b$, which engage the notches $c$ of the table, will bear against the side of the table and will therefore be pushed back some distance. These rollers actuate lugs 35, bearing against arms 36 of the lever 32. As the rollers are pushed back the lugs 35 move in with them and force the arm of the lever 36 back, throwing the hook 25 out of the recess 26. So long, therefore, as the table is not locked by the rollers engaging the notches of the table the hook 25 cannot enter the recess 26, and the catch U would be tripped when the projection 33 acts against the roller 30, as previously explained. A spring 37 pulls on the lever 32 to return the hook 25 to the recess 26 at the proper time. In order to remove the hook 25 from the recess 26 to allow the die-carrier to be withdrawn and the dies dusted, use is made of a lever 38, pivoted on the shaft 28 and having its upper arm bearing against the arm 32' of the lever 32. The lower arm of this lever 38 carries a roller 39, which engages the cam 40 on the wheel V. While this roller is engaging the cam 40 the upper arm of the lever 38 is thrown back, thus throwing out the hook of the lever 32 and allowing the die-carrier to be moved out, the dies dusted, and the carrier returned. The cam then ceases to engage the roller, and the locking action takes effect and after that the operation of the press itself.

Figure 3:
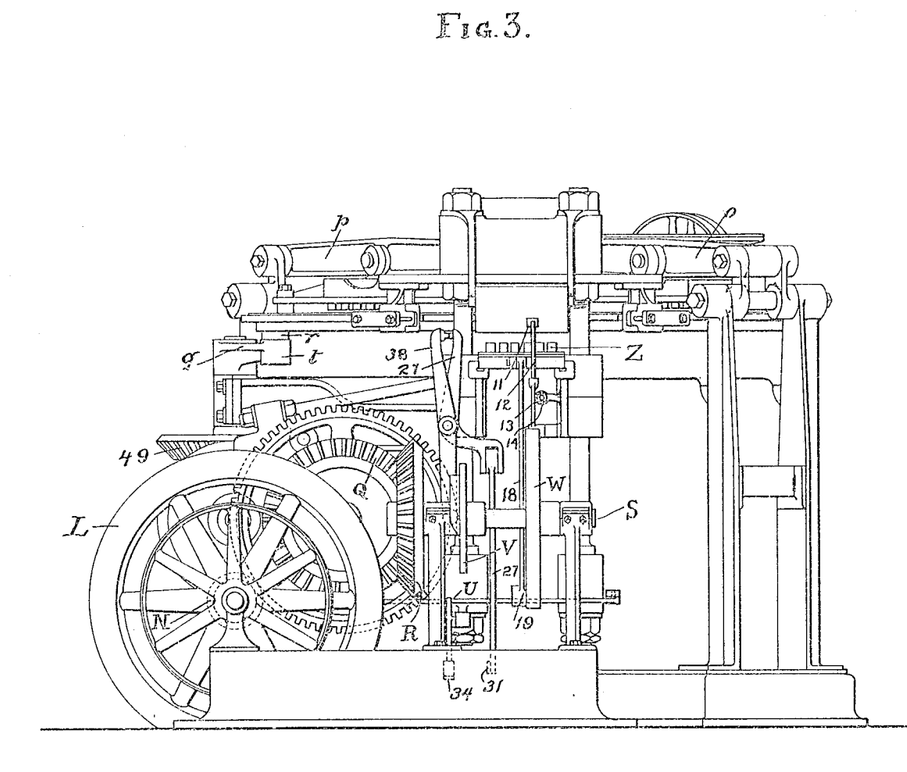
Fig. 3 is a side elevation.
Figures 6, 7:
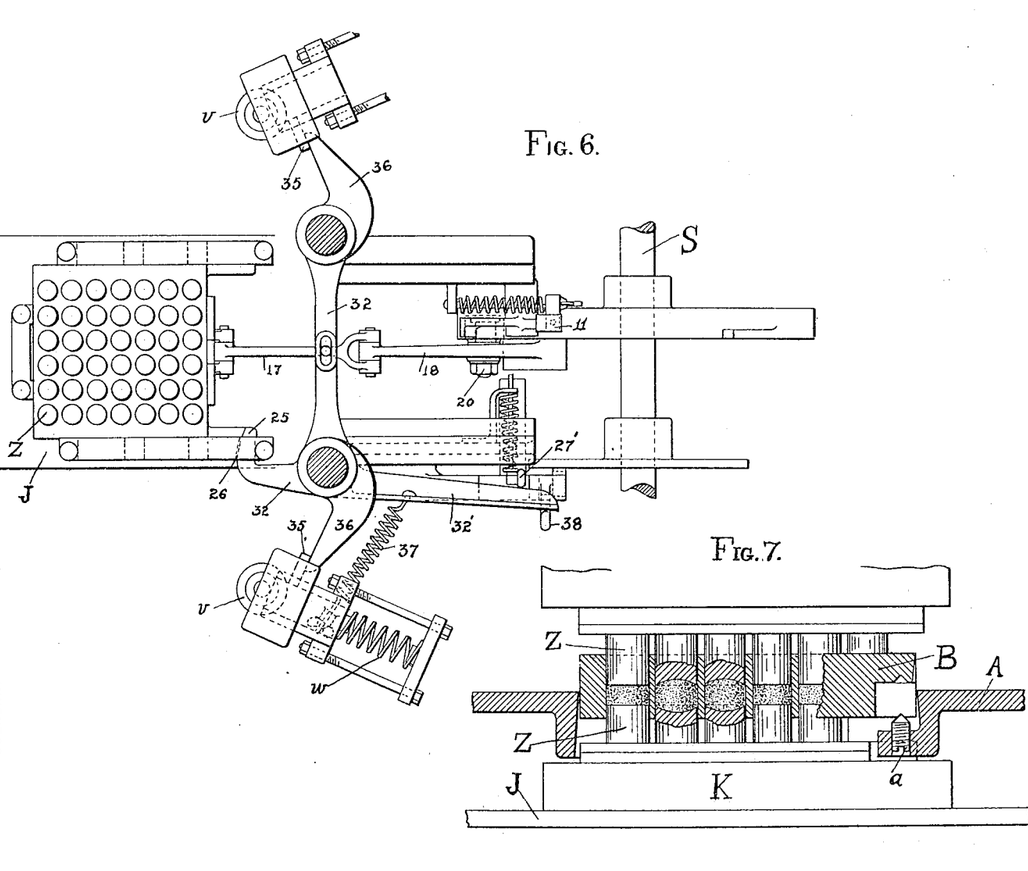
Fig. 6 is a top view of the locking and dusting mechanism.
Fig. 7 is a view, partly in section and partly in elevation, showing the relative positions of mold and dies of press during final compression.

Referring to Figs. 7 and 9 it will be seen that the molds B rest within the table loosely upon bearings $a$, Fig. 9, and are capable of motion in a vertical direction only, as previously explained. The upper and lower dies Z, Figs. 3, 5, and 7, on the head and platen, respectively, of the press G, fit the perforations $g$, Fig. 8, of the mold B. The upper dies are stationary, being secured to the stationary head of the press, while the lower dies are movable, being placed upon the platen of an ordinary toggle-press, actuated from the shaft P. The lower dies are either fixed to the platen or arranged to slide in and out for the purpose of dusting, as already explained. The stationary head of the press may be provided with a safety device—such as an ordinary hydraulic safety device—to take care of any excessive stress due to the compression. The faces of the dies are cut to the desired shape of the briquet, by preference concave, as shown in Fig. 7. The material having been compacted in the initial-compression press to an extent sufficient for the mold to retain it when it leaves the plate D is depressed somewhat below the top of the mold. As the platen of the press for final compression ascends the mold is carried up against the upper fixed dies and both sets of dies enter the mold more or less, thereby compressing the material as desired. Thus during the final compression the mold is clear of the table and no pressure is exerted upon the table, as shown in Fig. 7. As the lower die is withdrawn the mold sinks back into place and with the next motion of the table is moved along until it finally reaches the punching-out press H, Fig. 1, which is similar to the initial-compression press F, Fig. 1. The space below the mold at the punching-out press is vacant and the briquets drop upon a belt I, Fig. 1, which carries them away. The punching-out press H and the press for initial compression F are operated from the shaft P by intermediate mechanism.

Power is supplied from the fly-wheel L to the main shaft M through the action of a clutch T and is transmitted from this shaft to the gear-wheel 42 at the farther end of this shaft. This wheel carries a crank 43, from which reciprocating motion is imparted to the rod 47, Fig. 4, through link 44, bell-crank 45, and link 46. This rod operates the two levers $o$ and $p$, Fig. 1, for the initial-compression press and for the punching-out press, respectively. All the levers, links, gears, &c., are so arranged and proportioned that the action of the presses takes place while the table is at rest and the molds in their proper positions. The motion of the table is obtained through the gear-wheel 41, which engages with the gear-wheel 42, which in turn operates the miter-gear 48 and 49, giving motion to the vertical shaft 50, having fixed at its top the horizontal crank-arm $q$, carrying on its pin the block $r$, previously described.

In the case of materials not requiring dusting the two dusting devices may of course be omitted. A locking device may or may not be retained in either case, it being merely a safeguard.

I do not hereby intend to confine myself to any particular form of filling device for the molds or dusting-boxes, nor to any particular form of press or locking device, or to the particular means for transmitting motion to the various devices.

What I claim as my invention, and desire to secure by Letters Patent, is—

1. A briquet-machine comprising an annular table, a series of molds held within said table, a driving-shaft, intermediate mechanism for imparting step-by-step rotary motion to the annular table for presenting each mold successively to the various operations; a filling device; an initial-compression press; an annular segmental plate beneath the annular table, a final-compression press; dies fixed upon the upper stationary head of the final-compression press; dies fixed upon the platen of the final-compression press facing the former dies and arranged to move with the platen toward the stationary dies during the period of rest of the annular table; whereby the mold is slightly raised from its support and the material compressed to a thickness determined by the final distance between the faces of the dies; and a punching-out press for removing the compressed material from the mold.

2. A briquet-machine comprising an annular table supported vertically and laterally upon rollers mounted in eccentric bearings to allow vertical and radial adjustment of the said table, radial guide-grooves in said table, a series of molds held within said table, a driving-shaft, a vertical shaft, intermediate gearing to transmit rotary motion from the said driving-shaft to the said vertical shaft, a horizontal crank fastened to the said vertical shaft, a crank-pin at the farther end of the said horizontal crank, and a sliding block mounted to turn on the said crank-pin and engaging the guide-groove in the said annular table, whereby the molds are successively presented to the various operations; a filling device; an initial-compression press; an annular segmental plate beneath the annular table; a final-compression press; dies fixed upon the upper stationary head of the final-compression press; dies fixed upon the platen of the final-compression press facing the former dies and arranged to move with the platen toward the stationary dies during the period of rest of the annular table, and a punching-out press for removing the compressed material from the mold.

3. A briquet-machine comprising an annular table provided with a series of recesses for holding mold-plates in proper position, the said recesses spaced at equal angular and equal radial distances and fitted with lugs containing adjustable bearings for the mold-plates; a series of mold-plates fitting the said recesses and supported loosely by the said bearings; a driving-shaft, intermediate mechanism for imparting step-by-step rotary motion to the annular table for presenting each mold successively to the various operations; a filling device; an initial-compression press; an annular segmental plate beneath the annular table; a final-compression press; dies fixed upon the upper stationary head of the final-compression press; dies fixed upon the platen of the final-compression press facing the former dies and arranged to move with the platen toward the stationary dies during the period of rest of the annular table; and a punching-out press for removing the compressed material from the mold.

4. A briquet-machine comprising an annular table, a series of mold-plates with one or more perforations corresponding to the cross-section of the desired briquet, each mold-plate being provided with supporting-lips resting upon adjustable bearings in the table, a driving-shaft, intermediate mechanism for imparting step-by-step rotary motion to the annular table for presenting each mold successively to the various operations; a filling device consisting of a hollow revolving cylinder with transverse cross-arms at the bottom for moving the material across the molds; an initial-compression press; an annular segmental plate beneath the annular table; a final-compression press; dies fixed upon the upper, stationary head of the final-compression press; dies fixed upon the platen of the final-compression press facing the former dies and arranged to move with the platen toward the stationary dies during the period of rest of the annular table, and a punching-out press for removing the compressed material from the molds.

5. In a briquet-machine, one or more mold-plates loosely supported upon a movable carrier; a device for filling the molds; a press for initial compression of the material; a press for final compression of the material; a punching-out press for removing the compressed material from the molds; a plate placed beneath the carrier and extending from the said filling device past the said initial-compression press up to the platen of the final-compression press, the said plate to help retain the material within the molds and to receive the force of compression during the initial compression; mechanism for imparting step-by-step motion to the carrier so as to successively present the molds to the filling device, initial-compression press, final-compression press, and the discharging-press.

6. A briquet-machine comprising an annular table, a series of molds within said table, a driving-shaft, intermediate mechanism for imparting step-by-step rotary motion to the annular table for presenting each mold-plate successively to the various operations; a filling device; a device for dusting the upper surface of the filled mold-plates; an initial-compression press; an annular segmental plate extending beneath the annular table from the said filling device past the said compacting-press up to the platen of a final-compression press; a final-compression press; dies fixed to the press-head, dies arranged to rest upon the platen for compression and to be withdrawn for dusting between successive operations, a device for dusting the tops of the lower dies; and a punching-out press for removing the compressed material from the molds.

7. A briquet-machine comprising an annular table, a series of molds held within said table, a driving-shaft, intermediate mechanism for imparting step-by-step rotary motion to the annular table for presenting each mold successively to the various operations; a filling device; a device for dusting the upper surface of the filled molds; an initial-compression press; an annular segmental plate extending beneath the annular table from the said filling device past the said compacting-press up to the platen of a final-compression press; a final-compression press; dies fixed to the press-head, lower dies arranged to rest upon the platen for compression and to be withdrawn for dusting between successive operations; a device for dusting the tops of the lower dies; a suitable safety device; and a punching-out press for removing the compressed material from the molds.

8. In a briquet-machine, the combination of open-ended molds, a support therefor, means actuated while the molds rest upon said support for filling, dusting and preliminarily compressing the material; a press for final compression; suitable dies actuated by the said press, and means for presenting the molds to the dies and for withdrawing them for dusting between successive compressions.

In testimony whereof I have signed my name to this specification, in the presence of two subscribing witnesses, this 15th day of September, 1904.

FREDERICK WOOD MEEKER.

Witnesses:
FREDK. F. SCHURTZ,
RAENA H. YUDIZKY.